United States Patent
Kachare et al.

(10) Patent No.: US 10,691,368 B2
(45) Date of Patent: Jun. 23, 2020

(54) SYSTEM AND METHOD FOR PROVIDING DATA REPLICATION IN NVME-OF ETHERNET SSD

(71) Applicant: Samsung Electronics Co., Ltd., Suwon-si, Gyeonggi-do (KR)

(72) Inventors: Ramdas Kachare, Cupertino, CA (US); Fred Worley, San Jose, CA (US); Sompong P. Olarig, Pleasanton, CA (US); Oscar Pinto, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 303 days.

(21) Appl. No.: 15/617,925

(22) Filed: Jun. 8, 2017

(65) Prior Publication Data
US 2018/0284989 A1    Oct. 4, 2018

Related U.S. Application Data

(60) Provisional application No. 62/480,113, filed on Mar. 31, 2017.

(51) Int. Cl.
| | |
|---|---|
| *G06F 3/06* | (2006.01) |
| *G06F 13/28* | (2006.01) |
| *G06F 13/40* | (2006.01) |

(52) U.S. Cl.
CPC .............. *G06F 3/065* (2013.01); *G06F 3/061* (2013.01); *G06F 3/0634* (2013.01); *G06F 3/0635* (2013.01); *G06F 3/0688* (2013.01); *G06F 13/28* (2013.01); *G06F 13/4022* (2013.01)

(58) Field of Classification Search
CPC ....................................................... G06F 3/065
See application file for complete search history.

(56) References Cited

U.S. PATENT DOCUMENTS

| | | | |
|---|---|---|---|
| 9,015,525 B2 | 4/2015 | Samanta et al. | |
| 9,471,259 B2 | 10/2016 | Goel et al. | |
| 2010/0082793 A1 | 4/2010 | Woods et al. | |
| 2012/0254508 A1* | 10/2012 | Walls | G06F 11/2087 |
| | | | 711/103 |
| 2013/0117621 A1* | 5/2013 | Saraiya | H04L 49/356 |
| | | | 714/748 |
| 2013/0339786 A1* | 12/2013 | Samanta | G06F 11/1666 |
| | | | 714/6.23 |

(Continued)

*Primary Examiner* — Yves Dalencourt
*Assistant Examiner* — S M Z Islam
(74) *Attorney, Agent, or Firm* — Innovation Counsel LLP

(57) ABSTRACT

A data replication system has a chassis including a plurality of eSSDs, a fabrics switch, and a baseboard management controller (BMC). The BMC configures one of the plurality of eSSDs as an active eSSD and one or more of the plurality of eSSDs as one or more passive eSSDs. The fabrics switch of the chassis is programmed to forward packets destined for the active eSSD to both the active eSSD and the one or more passive eSSDs. In response to a host data write command received from the host, the active eSSD stores the host data and sends an address and an instruction corresponding to the host data to the one or more passive eSSDs. Each of the one or more passive eSSDs stores a copy of the host data using the address and the instruction received from the active eSSD and the host data received in the packets forwarded by the fabrics switch.

20 Claims, 10 Drawing Sheets

(56) References Cited

U.S. PATENT DOCUMENTS

| | | | |
|---|---|---|---|
| 2016/0004877 A1* | 1/2016 | Hayes | G06F 21/6218 |
| | | | 713/165 |
| 2016/0299704 A1* | 10/2016 | Vanaraj | G06F 11/1076 |
| 2016/0352831 A1 | 12/2016 | Totolos et al. | |
| 2017/0011002 A1* | 1/2017 | Shin | G06F 13/4282 |
| 2017/0153955 A1* | 6/2017 | Lee | G06F 11/2069 |
| 2018/0302315 A1* | 10/2018 | Kamisetty | H04L 12/462 |

* cited by examiner

SYSTEM AND METHOD FOR PROVIDING DATA REPLICATION IN NVME-OF ETHERNET SSD

CROSS-REFERENCE TO RELATED APPLICATION(S)

This application claims the benefits of and priority to U.S. Provisional Patent Application Ser. No. 62/480,113 filed Mar. 31, 2017, the disclosure of which is incorporated herein by reference in its entirety.

TECHNICAL FIELD

The present disclosure relates generally to a system and method for providing data replication, more particularly, to a system and method for providing data replication in a solid-state drives (SSD).

BACKGROUND

Solid-state drives (SSDs) are rapidly becoming main storage elements of modern information technology (IT) infrastructures, replacing traditional hard disk drives (HDD). SSDs offer a low latency, a high data read/write throughput, and reliable storage of user data. Non-volatile memory express (NVMe) over fabrics (NVMe-oF) is an emerging technology that allows hundreds and thousands of NVMe-compatible SSDs to be connected over a network fabric such as Ethernet. An SSD that is compatible with the NVMe-oF standard over an Ethernet connection is referred to as an Ethernet-attached SSD, or in short, an eSSD.

The NVMe-oF protocol supports the remote direct-attached storage (rDAS) protocol that allows a large number of eSSDs to be connected to a remote host over the network fabric. The NVMe-oF protocol further supports the remote direct memory access (RDMA) protocol to provide a reliable transport service to carry NVMe commands, data, and responses between the remote host and the eSSDs over a network fabric. Examples of the transport protocols that can provide RDMA services include InfiniBand, iWARP, RoCE v1, and RoCE v2.

Reliable access to user data is one of the most critical requirements of a data storage system. Various techniques and methods have been employed at various points in a data storage system to achieve a necessary degree of reliability and data availability. For instance, data written to a storage device is replicated to one or more other storage devices as a backup storage when the storage device becomes unavailable. This data replication scheme is often referred to as mirroring or back-up.

In a chassis where a plurality of eSSDs are connected, each eSSD may be directly connected to a host over the Ethernet. The host can perform data replication to two or more eSSDs for data mirroring. However, the implementation of the data replication function by the host adds a burden to the host and the system software, resultantly adding an extra latency to data input/output (I/O) operations and increasing an overall cost to the data storage system.

Alternatively, an inline redundant array of independent disks (RAID) controller may be embedded in an SSD to perform data replication in a manner that is transparent to the host. However, the RAID controller is generally costly and may degrade the I/O performance by adding an extra latency. Further, an SSD with an embedded RAID controller may consume power at or near a maximum power budget under a heavy load or maximum input/output operations per second (IOPS) and fail to meet the power consumption requirement of the eSSD according to the NVMe-oF standard. Therefore, data replication by an embedded RAID controller in an eSSD may not be a viable solution for an NVMe-oF-compatible data storage system.

SUMMARY

According to one embodiment, a method includes: providing a data replication system comprising a plurality of solid-state drives (eSSDs) contained in a chassis, wherein the chassis includes a fabrics switch for providing downlinks to each of the plurality of eSSDs and a baseboard management controller (BMC) for controlling the fabrics switch and the plurality of eSSDs; configuring, using the BMC, one of the plurality of eSSDs as an active eSSD; configuring, using the BMC, one or more of the plurality of eSSDs as one or more passive eSSDs; programming the fabrics switch, using the BMC, to forward packets destined for the active eSSD to both the active eSSD and the one or more passive eSSDs; receiving, at the active eSSD, a host data write command from the host; sending an address and an instruction corresponding to the host data from the active eSSD to the one or more passive eSSDs; storing the host data in the active eSSD; and storing a copy of the host data in the one or more passive eSSDs using the address and the instruction received from the active eSSD and the host data received in the packets forwarded by the fabrics switch.

According to another embodiment, a data replication system includes a chassis including a plurality of eSSDs, a fabrics switch, and a baseboard management controller (BMC). The fabrics switch is configured to provide downlinks to each of the plurality of eSSDs, and the BMC is configured to control the fabrics switch and the plurality of eSSDs. The BMC configures one of the plurality of eSSDs as an active eSSD and one or more of the plurality of eSSDs as one or more passive eSSDs and programs the fabrics switch to forward packets destined for the active eSSD to both the active eSSD and the one or more passive eSSDs. The active eSSD is configured to store host data in response to a host data write command received from the host. The active eSSD is further configured to send an address and an instruction corresponding to the host data to the one or more passive eSSDs. Each of the one or more passive eSSDs is configured to store a copy of the host data using the address and the instruction received from the active eSSD and the host data received in the packets forwarded by the fabrics switch.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
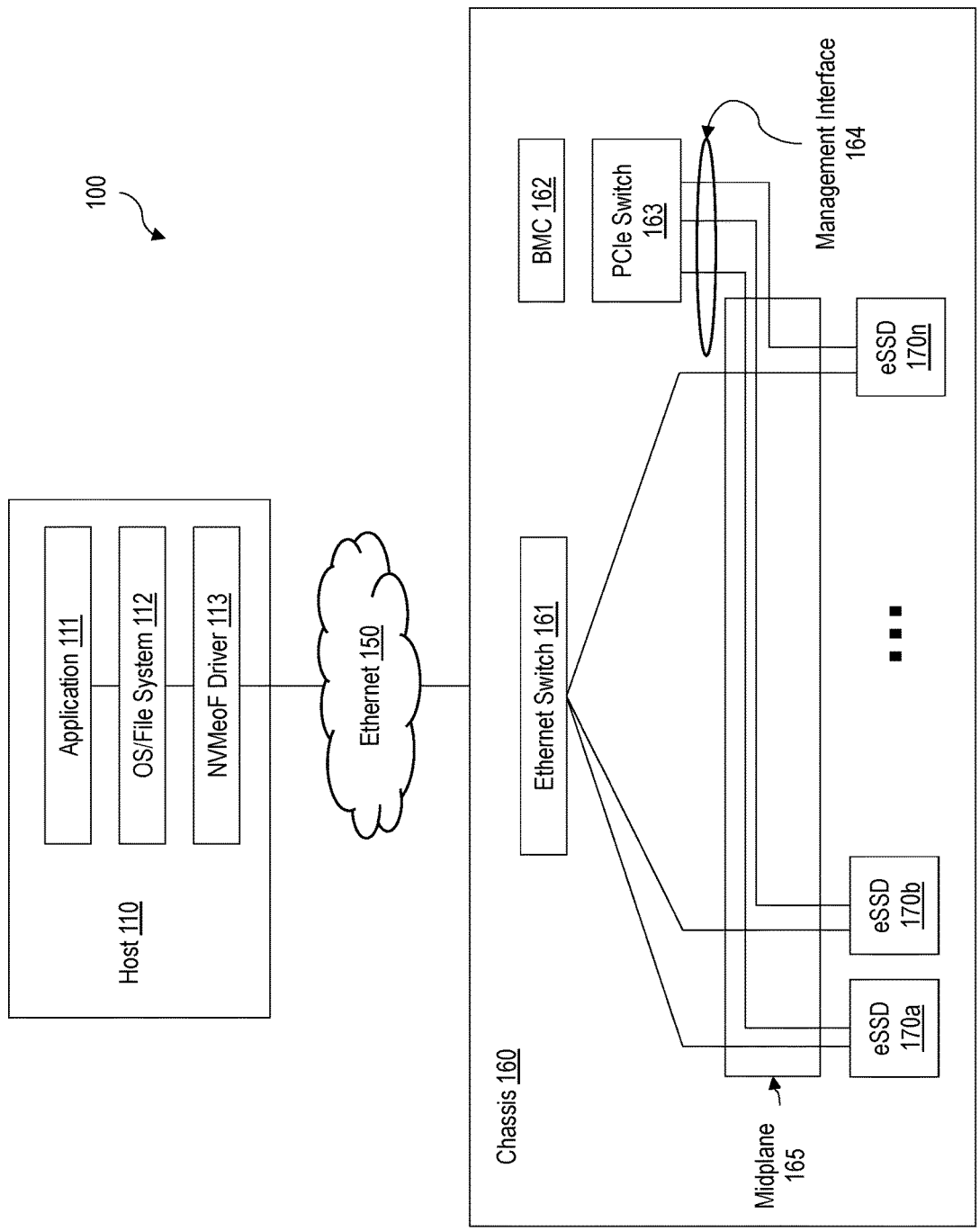
FIG. 1 shows a block diagram of an example NVMe-oF system, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide data replication in an Ethernet SSD. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure provides a system and method for providing data replication using one or more SSDs that are compatible with NVMe-oF standards (herein referred to as Ethernet SSDs or eSSDs). The data replication employed by the present system and method can be achieved without a host participation or expensive and performance-affecting external components such as central processing unit (CPU) or a RAID controller.

According to one embodiment, each of the eSSDs in a chassis can be configured and operate in an active mode, a passive mode, and a normal mode. A baseboard management controller (BMC) of the chassis can program one of the eSSDs in the chassis as an active eSSD and one or more of the remaining eSSDs as passive eSSDs. An eSSD that is configured as neither an active eSSD nor a passive eSSD can operate in the normal mode and behave as a standard NVMe-oF SSD. Between the active and passive eSSDs, only the active eSSD is visible (discoverable) to a remote host and can perform termination of the NVMe-oF protocol with the remote host. In contrast, the passive eSSDs are invisible (non-discoverable) to the remote host. Herein, a remote host that may reside over the network fabric (e.g., Ethernet) may be simply referred to as a host for convenience.

The active eSSD can process commands issued by the host, perform data transfers to and from the host, and send completion queue (CQ) entries to the host to indicate a successful completion or an execution failure of the host commands. The passive eSSDs in the chassis neither execute any host commands nor participate in the host protocol. Instead, the passive eSSDs passively receive ingress traffic packets that are destined for the active eSSD. For example, the Ethernet switch of the chassis is programmed to replicate all the ingress packets directed to an active eSSD to the passive eSSDs that are programmed to be associated with the active eSSD.

According to one embodiment, the passive eSSDs discard all the replicated ingress packets except RDMA READ RESPONSE packets. The RDMA READ RESPONSE packets provide host write data, and the host write data is kept in a FIFO buffer of the host. The host write data in the FIFO buffer is fetched by the active eSSD. After fetching the host write data, the active eSSD provides an instruction (e.g., a write instruction) and an associated logical block address (LBA) and/or a namespace for writing the host write data to the associated passive eSSD. Using the instruction and the LBA provided by the active eSSD and the data received from the replicated RDMA READ RESPONSE packets, the passive eSSD can write the replicated data to its non-volatile memory. The non-volatile memory of the passive eSSD may be a flash memory or a persistent memory. Depending on the configuration, more than one passive eSSDs can replicate the host write data.

According to one embodiment, the LBA/namespace and the write instruction that the active eSSD sends to the associated passive eSSDs can contain finer details in an RDMA queue pair (QP) including a send queue and a receive queue. There could be multiple active QPs enabled by the host in a path established between the active eSSD and the passive eSSDs that may require the exchange of additional information via the QPs. According to one embodiment, the passive eSSDs on every RDMA_READ REPONSE peek into an RDMA header for the additional information on a data chunk regarding a host write association such as the QP and the sequencing of data.

According to one embodiment, the active eSSD can send the write instruction one time after receiving a host write request from the host and before sending one or more RDMA READ requests to the host. The active eSSD can calculate in advance how the host write is broken down into one or more individual RDMA READ requests and how the associated data is received in a segment scatter gather list (SGL). This may reduce the traffic of the private channel as well as the PCIe bus or the network fabric, thereby improving the I/O performance when multiple QP connections are engaged and across multiple data replication sets. Furthermore, it can reduce the overhead for data replication when data is replicated across enclosures, racks, data centers and multiple geo locations.

The passive eSSD can be configured to send a confirmation to the active eSSD indicating that the host write data has been successfully persisted or the storage of the host write data has failed. The active eSSD may wait for the confirmation from all of the associated passive eSSDs before sending a completion queue entry to the host. This confirmation mechanism can protect and guarantee the data persistence of the host write data at all times.

The present system and method does not need a target-side x86 server or an external application-specific integrated circuit (ASIC) for RAID-on-Chip (ROC) to support the data replication feature. The present system and method offers a reduced total cost of ownership (TCO) while enhancing the data storage performance by eliminating or reducing the additional hardware and software overhead on the host. The present system and method has an improved I/O latency and bandwidth performance compared to conventional in-line data replication solutions in which data replication is performed concurrently with the data I/O operations.

The present system and method is a cost effective and efficient solution for providing data replication because the data replication features are implemented primarily in the eSSDs (i.e., active eSSD and passive eSSD(s)) and the Ethernet switch of a chassis. The present system and method eliminates a need for complex system software and hardware and reduces the burden and the cost on a host side for additional compute, storage, and power. The present data replication feature is implemented in a chassis containing the eSSDs and the Ethernet switch with minimal or no changes to a host side.

FIG. 1 shows a block diagram of an example NVMe-oF system, according to one embodiment. The NVMe-oF system 100 includes a host 110 and a chassis 160 (herein also referred to as an eSSD chassis) containing one or more NVMe-oF-compatible Ethernet SSDs (eSSDs). For example, the chassis 160 includes 24 or 48 eSSDs. The eSSDs in the chassis 160 are respectively denoted as eSSDs 170a-170n (herein collectively referred to as eSSDs 170). The host 110 includes an application 111, an operating system (OS) and a file system (FS) 112, and an NVMe-oF driver 113. An initiator (e.g., the application 111) of the host 110 can establish an NVMe-oF connection with the eSSDs 170 over the Ethernet 150 using the NVMe-oF driver 113. The chassis 160 includes an Ethernet switch 161, a baseboard management controller (BMC) 162, and a PCIe switch 163. The Ethernet switch 161 provides an Ethernet connection to the eSSDs 170 over the midplane 165, and the PCIe switch 163 provides a management interface 164 to the eSSDs 170 over the midplane 165. In the present example, one of the eSSDs 170 can be configured as an active eSSD, and other eSSDs can be configured as passive eSSDs. The BMC 162 can program the eSSDs 170 the eSSDs according to an instruction given by a system administrator.

The Ethernet switch 161 provides network connectivity between the host 110 and the eSSDs 170. The Ethernet switch 161 may have large-capacity (e.g., 100 Gbps) uplinks to connect to one or more hosts. The Ethernet switch 161 also has multiple lower-capacity (e.g., 25 Gbps) downlinks to connect to the eSSDs 170. For example, the Ethernet switch 161 contains 12 uplinks of 100 Gbps and 24 or 48 downlinks of 25 Gbps. The Ethernet switch 161 may have a special configuration/management port to the BMC 162 (not shown).

The BMC 162 manages the internal components of the chassis 160 including the Ethernet switch 161, the PCIe switch 163, and the eSSDs 170. The BMC 162 can support PCIe and/or SMBus interfaces for the system management. The BMC 162 can configure the active eSSD and passive eSSDs and program the Ethernet switch 161. When the active eSSD fails, the BMC 162 can perform a failover switching, designate a new active eSSD, and configures additional passive eSSDs if desired.

According to one embodiment, the eSSDs 170 in the chassis 160 can operate in one of three modes: active, passive, and normal. The eSSDs 170 that are configured as an active eSSD and one or more passive eSSDs can provide the desired data replication. In some embodiments, the chassis 160 can include multiple active/passive eSSD sets. When data replication is not needed for a given eSSD, the BMC 162 can configure the eSSD in a normal mode. An eSSD that is configured as a normal eSSD behaves as a standard NVMe-oF SSD.

Figure 2:
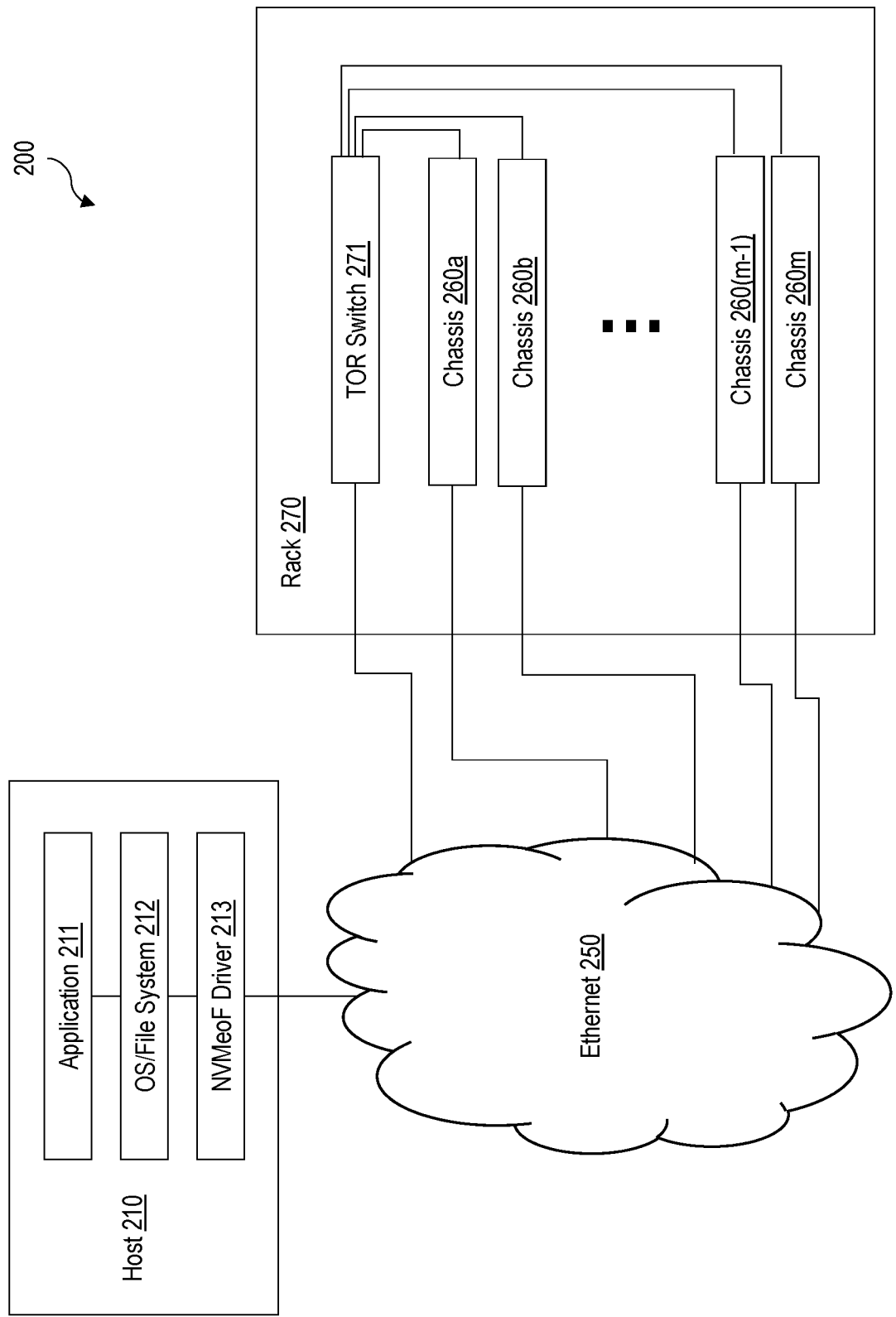
FIG. 2 shows a block diagram of an example NVMe-oF system, according to another embodiment.

FIG. 2 shows a block diagram of an example NVMe-oF system, according to another embodiment. The NVMe-oF system 200 includes a host 210 and a plurality of eSSD chassis 260a-260m (collectively referred to as eSSD chassis 260) that are connected to the host 210 over the Ethernet 250. The host 210 includes an application 211, an operating system (OS) and a file system (FS) 212, and an NVMe-oF driver 213 for connecting with each of the eSSD chassis 260 in a rack 270 over the Ethernet 150. The rack 270 includes a top-of-rack (TOR) switch 271 that provides connectivity among the multiple chassis 260 in the rack 270. Similarly, the NVMe-oF system 200 can include multiple racks 270 that may be located at different locations. The racks 270 can be connected to each other through their TOR switches 271. The TOR switches 271 of the multiple racks 270 may be connected to each other directly via dedicated lines or through external switches over the Ethernet 250.

Figure 3:
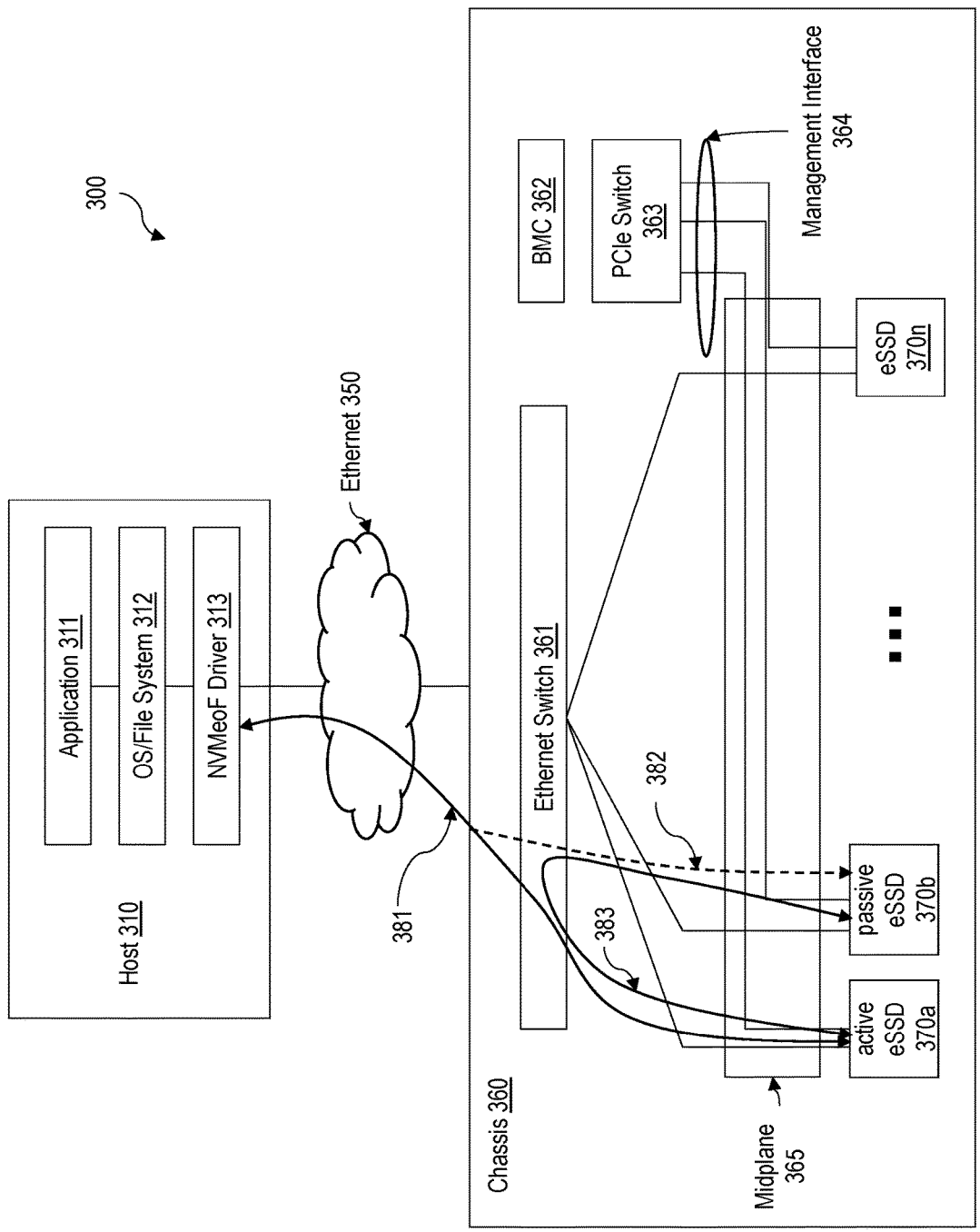
FIG. 3 illustrates a data replication process of an example NVMe-oF system, according to one embodiment.

FIG. 3 illustrates a data replication process of an example NVMe-oF system, according to one embodiment. The NVMe-oF system 300 includes a host 310 and a chassis 360 containing multiple eSSDs including eSSDs 370a-370n. For example, the chassis 360 may include 24 or 48 eSSDs. The host 310 includes an application 311, an operating system (OS) and a file system (FS) 312, and an NVMe-oF driver 313. An initiator (e.g., the application 311) of the host 310 can establish an NVMe-oF connection with the active eSSD 370a over the Ethernet 350 using the NVMe-oF driver 313. The chassis 360 includes an Ethernet switch 361, a BMC 362, and a PCIe switch 363. The Ethernet switch 361 provides an Ethernet connection to the eSSDs 370 over the midplane 365, and the PCIe switch 363 provides a management interface 364 to the eSSDs 370 over the midplane 365. The BMC 362 can program one of the eSSDs 370 as an active eSSD 370a, and other eSSDs as passive eSSDs. For the convenience of illustration, the present example shows one active eSSD 370a and one passive eSSD 370b; however, it is noted that a replication group of the eSSDs includes an active eSSD and one or more passive eSSDs, and more than one replication groups can exist in a chassis without deviating from the scope of the present disclosure. The passive eSSD 370b may represent one of multiple passive eSSDs that are configured to be associated with the active eSSD 370a. The activities performed by the passive eSSD 370b can be concurrently performed by other passive eSSDs in the chassis 360. For example, the same data can be replicated to more than two passive eSSDs if the NVMe-oF system 300 is so configured. In some embodiments, the chassis 360 can contain more than one replication groups, and each of the replication groups can include one active eSSD and one or more passive eSSDs that are programmed to provide data replication in conjunction with the active eSSD within the replication group.

The active eSSD 370a can handle all the NVMe-oF protocol processing and termination with the host 310. The transport protocol of the NVMe-oF system 300 between the host 310 and the active eSSD 370a is implemented using a submission queue (SQ) and a completion queue (CQ). The location address of the active eSSD 370a is advertised to the host 310 so that the active eSSD 370a is visible to the NVMe-oF driver 313 that is invoked by the application 311 running on the host 310. When the active eSSD 370a receives a host write data, the active eSSD 370a sends one or more LBAs that are associated with the host write data and necessary instruction to the associated passive eSSD 370b over a private communications channel. In one embodiment, the active eSSD 370a and the passive eSSDs 370b can form a private, low-bandwidth communications channel through the Ethernet switch 361 or through the PCIe switch 363 in the chassis 360.

The passive eSSD 370b can store a copy of the host data that is written to the active eSSD. The BMC 362 can program the Ethernet switch 361 to replicate the active ingress traffic designated to the active eSSD 370a to the passive eSSD 370b so that the passive eSSD 370b can receive a copy of all the ingress packets destined for the active eSSD 370a. The passive eSSD 370b filters out the received packets and keeps only RDMA READ RESPONSE packets among the received packets. The passive eSSD 370b parses the received RDMA READ RESPONSE packets and extracts the host write data chunks carried in the RDMA READ RESPONSE packets. The passive eSSD 370b also receives the data replication instruction and the LBAs corresponding to the data chunks from the active eSSD. The passive eSSD 370b uses the LBA information and the received data from the RDMA READ RESPONSE packets to persist the host data in its storage medium. In some embodiments, the Ethernet switch 362 filters the ingress packets to provide only the RDMA READ RESPONSE packets to the passive eSSDs. After the host data is persisted, the passive eSSD 370b may send a confirmation to the active eSSD 370a over the established private communication channel.

The BMC 362 is responsible for setting up a data replication feature under a guidance of a storage administrator. In one embodiment, the BMC 362 uses the NVMe-MI protocol over the SMBus or the PCIe bus to configure the eSSDs 370. First, the BMC 362 identifies an eSSD and programs the eSSD in the active mode. Further, the BMC 362 selects one or more eSSDs and programs the eSSDs as passive eSSDs. The number of passive eSSDs configured by the BMC 362 may depend upon a number of data copies specified by the storage administrator. The BMC 362 programs those eSSDs in the passive mode.

Once the active and passive eSSDs 370 are properly configured, the BMC 362 configures the Ethernet switch 361. The Ethernet switch 361 can replicate and forward ingress packets destined for the downlink port corresponding to the active eSSD 370a to the downlink ports corresponding to the passive eSSD 370b. After the eSSDs 370 and the Ethernet switch 361 are properly configured, the storage administrator and/or the BMC 362 may advertise to application 311, the OS/file system 312 of the host 310 that the eSSDs 370 are ready for data storage and replication.

Figure 4:
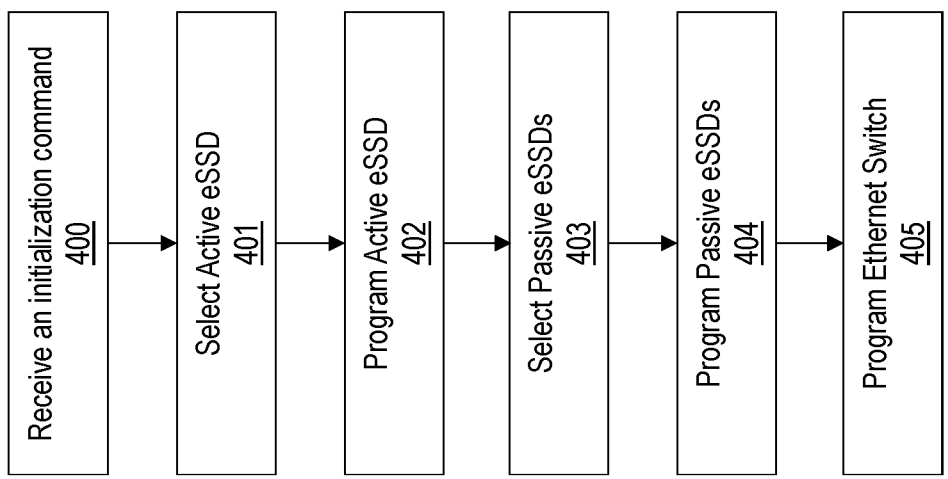
FIG. 4 is a flowchart for initializing and programming eSSDs and an Ethernet switch of a chassis to implement data duplication, according to one embodiment.

FIG. 4 is a flowchart for initializing and programming eSSDs and an Ethernet switch of a chassis to implement data duplication, according to one embodiment. The initialization process is triggered with an initialization command issued by a storage administrator (400). In response to the initialization command, a BMC of the chassis selects an eSSD (401) and programs the selected eSSD to configure it as an active eSSD (402). According to one embodiment, the initialization command may include a unique identifier (e.g., an IP address, a MAC address) for the active eSSD, and the BMC sends a configuration command to the active eSSD to configure it in the active mode using the NVMe-MI protocol over the SMBus or the PCIe bus.

After the active eSSD is programmed, the BMC of the chassis selects one or more eSSDs (403) and programs the selected eSSDs as passive eSSDs (404). According to one embodiment, the BMC of the chassis selects and programs the passive eSSDs as instructed in the initialization command received from the storage administrator. For example, the initialization command to the BMC may include identifiers (e.g., IP addresses, MAC addresses) of the passive eSSDs, and the BMC sends a configure command to the respective pass eSSDs to configure them in the passive mode using the NVMe-MI protocol over the SMBus or the PCIe bus.

According to one embodiment, the selection and programming of the active eSSD and the passive eSSDs may be performed concurrently or in an opposite order. In other words, the BMC may select and program the passive eSSDs first, and select and program the active eSSD, or configure the active eSSD and the passive eSSDs concurrently.

After the eSSDs are programmed, the BMC programs an Ethernet switch of the chassis (405). For example, the Ethernet switch creates a mapping table that provides an association between the active eSSD and the passive eSSDs. After being programmed, the Ethernet switch replicates ingress packets destined for the active eSSD to the associated passive eSSDs. In one embodiment, the Ethernet switch may filter the ingress packets and send only RDMA READ RESPONSE packets to the passive eSSDs.

The active eSSD is discoverable by a host and can communicate with an NVMe-oF driver running on the host. The host may send host commands to the active eSSD using the NVMe-oF protocol. The active eSSD executes all of the host commands, performs any data transfers necessary, and sends the command completion queue entries to the host. In other words, the active eSSD performs the NVMe-oF protocol processing and executes the host commands as performed by a normal eSSD. In addition, the active eSSD supports data replication in conjunction with one or more passive eSSDs. The data replication primarily pertains to host write commands. For host read commands, the active eSSD may not need to support any special functions.

For the host write commands, the active eSSD is responsible for fetching the data from the host. According to one embodiment, the active eSSD issues RDMA READ requests to the host to fetch the host data. In response, the host sends the data chunks using one or more RDMA READ RESPONSE packets. The active eSSD stores the host data chunks received in the RDMA READ RESPONSE packets to its internal flash memory or persists the host data in a power-loss-protected buffer.

For every data chunk of the host data received in RDMA READ RESPONSE packets, the active eSSD sends the associated NAMESPACE and LBA information along with a write instruction to each of the associated one or more passive eSSDs. This communication may be done over the private communication channel established between the active and the passive eSSDs. The private communication channel may be formed through the Ethernet switch or the PCIe switch of the chassis. If the active eSSD becomes non-operational or the active eSSD fails to write the received data chunk, the active eSSD sends a discard instruction to the passive eSSDs to discard the data chunks.

Once the host data is persisted locally and NAMESPACE.LBA information is sent to the passive eSSDs, the active eSSD can send a command completion to the host based on a consistency mode. According to one embodiment, the active eSSD can immediately send a command completion to the host without waiting for the responses from the passive eSSDs regarding the data persistence. The immediate command-completion-response, herein referred to as an almost-perfect consistency mode, may provide a slightly better latency performance at a risk of the back-up copy not getting persisted faithfully. The probability of such error cases may be small, and there may be applications that are tolerant to small amount of data loss. The detailed analysis of such error cases will be discussed below in further detail.

According to another embodiment, the active eSSD can wait for the confirmation of the data persistence from the passive eSSDs. If there are more than one back-up copies being replicated, the active eSSD may wait for confirmations from one to all the associated passive eSSDs before sending a command completion entry to the host. Since the data replication may occur in parallel to the storage of the host data in the main data path (e.g., to the active eSSD), the wait for the confirmation from the passive eSSDs may add a modest amount of latency that may or may not be acceptable to the application running on the host. Contrary to the almost-perfect consistency mode that employs an immediate command-completion-response, this mode of operation, herein also referred to as a perfect consistency mode, that waits for the responses from all the associated passive eSSDs guarantees the faithful data consistency with no data loss.

According to one embodiment, the consistency mode of the NVMe-oF system can be set by the BMC using various user quality of service (QoS) policies. The trade-off between the consistency and the latency may be application-dependent and the BMC can implement various policies under the direction of the storage administrator. In a case where the active and passive eSSDs go out of synch from a data consistency point of view, they need to be recovered or brought to the same level of synchronization. Such a recovery function can be managed by the BMC. To facilitate a recovery operation, the active eSSD maintains a log of last "n" number of successful write operations. For example, the log includes NAMESPACE.LBA and a marker indicating a particular write operation.

The active eSSD may also send some admin commands to the associated passive eSSDs to facilitate the data replication process. Examples of such admin commands include, but are not limited to, create/delete NAMESPACE and Trim commands. After executing the admin commands, the passive eSSDs may send confirmations back to the active eSSD.

Figure 5:
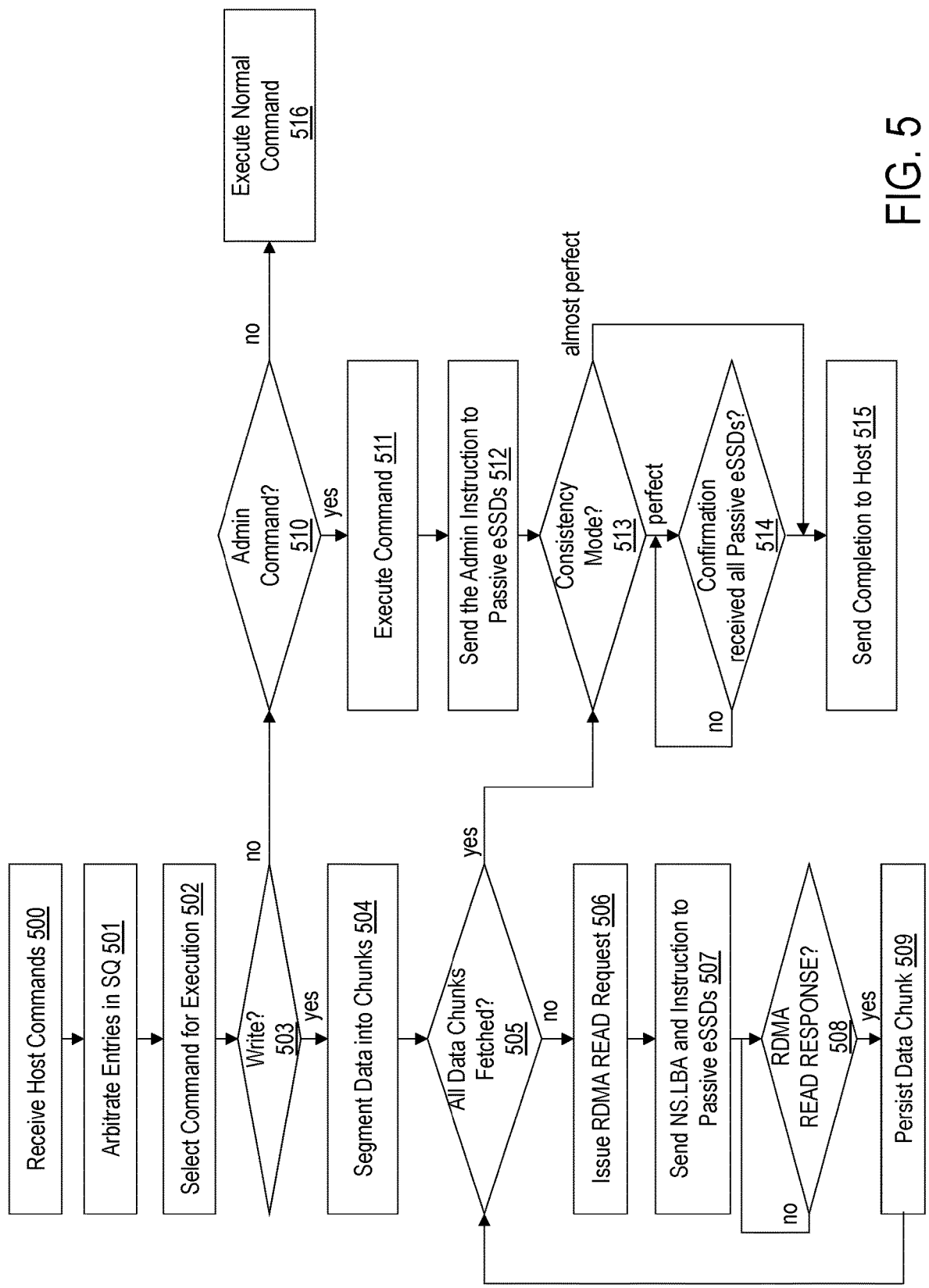
FIG. 5 is a flowchart for processing host commands by an active eSSD, according to one embodiment.

FIG. 5 is a flowchart for processing host commands by an active eSSD, according to one embodiment. Every eSSD that is configured as a passive eSSD has an association with an active eSSD. The association between the active eSSD and the passive eSSD can be set by the BMC as a part of the initialization as shown in FIG. 4. One of the primary functionalities of a passive eSSD is to replicate host data. In one embodiment, the passive eSSD can performs the data replication of the host data by maintaining two parallel FIFO queues, one for storing the host data (herein also referred to as a "Received Message FIFO") and the other for storing the write address and the instruction (herein also referred to as an "LBA and Instruction FIFO"). The passive eSSD uses these two FIFOs to persist the host data when the host data is written to the active eSSD.

The active eSSD receives host commands from a host and places the received host commands in a submission queue (SQ) as they are received (500). The active eSSD arbitrates the entries in the submission queue (501) and selects a host command for execution from the submission queue (502). The host command may be one of a host write command (503), an admin command (510), or a normal command (516).

If the selected host command is a host write command (503), the host write command includes host data to write in an internal storage device of the active eSSD. The active eSSD segments the host data into data chunks, for example, according to a storage unit of the storage device (e.g., a page size or a block size of a flash memory) (504). The active eSSD checks if all data chunks associated with the host write command are fetched (505). If there remains at least one data chunk to fetch among the segmented data chunks, the active eSSD issues a RDMA READ request to the host to fetch the remaining data chuck (506). For each data chunk, the active eSSD sends NAMESPACE.LBA and an instruction to each of the associated passive eSSDs (507). The issuance of the RDMA READ request to the host and the issuance of the NAMESPACE.LBA and the instruction to the passive eSSDs may be performed concurrently. After the RDMA READ RESPONSE packet for the data chunk is received, the active eSSD persists the data chunk in the internal storage device (e.g., a flash memory) (509). It is noted that the fetched data chunks may be temporarily stored in a data buffer of the active eSSD, and all of the data chunks associated with a single host write command may be persisted at the same time.

Once all the data chunks are fetched and persisted, the active eSSD checks the consistency mode (513). According to one embodiment, the consistency mode may be set to be either "perfect" or "almost perfect." If the consistency mode of the active eSSD is set to be "perfect," the active eSSD waits for confirmation from all of the passive eSSDs that are associated with the active eSSD (514) and sends a completion queue entry to the host (515). If the consistency mode of the active eSSD is set to be "almost perfect," the active eSSD sends a completion queue entry to the host (515) without waiting for the confirmation from the associated passive eSSDs.

If the received host command is an admin command including a create namespace command, or a trim command (510) related with one or more of the associated passive eSSDs, the active eSSD executes the received command (511), and send the instruction to the corresponding passive eSSDs (512). Depending on the consistency mode (513), the active eSSD sends a completion queue entry to the host with or without waiting for the confirmation from the associated passive eSSDs (515). If the received host command is neither a host write command or an admin command, the active eSSD treats the received command as a normal command that does not relate to the data replication and executes the normal command accordingly (516).

Figure 6:
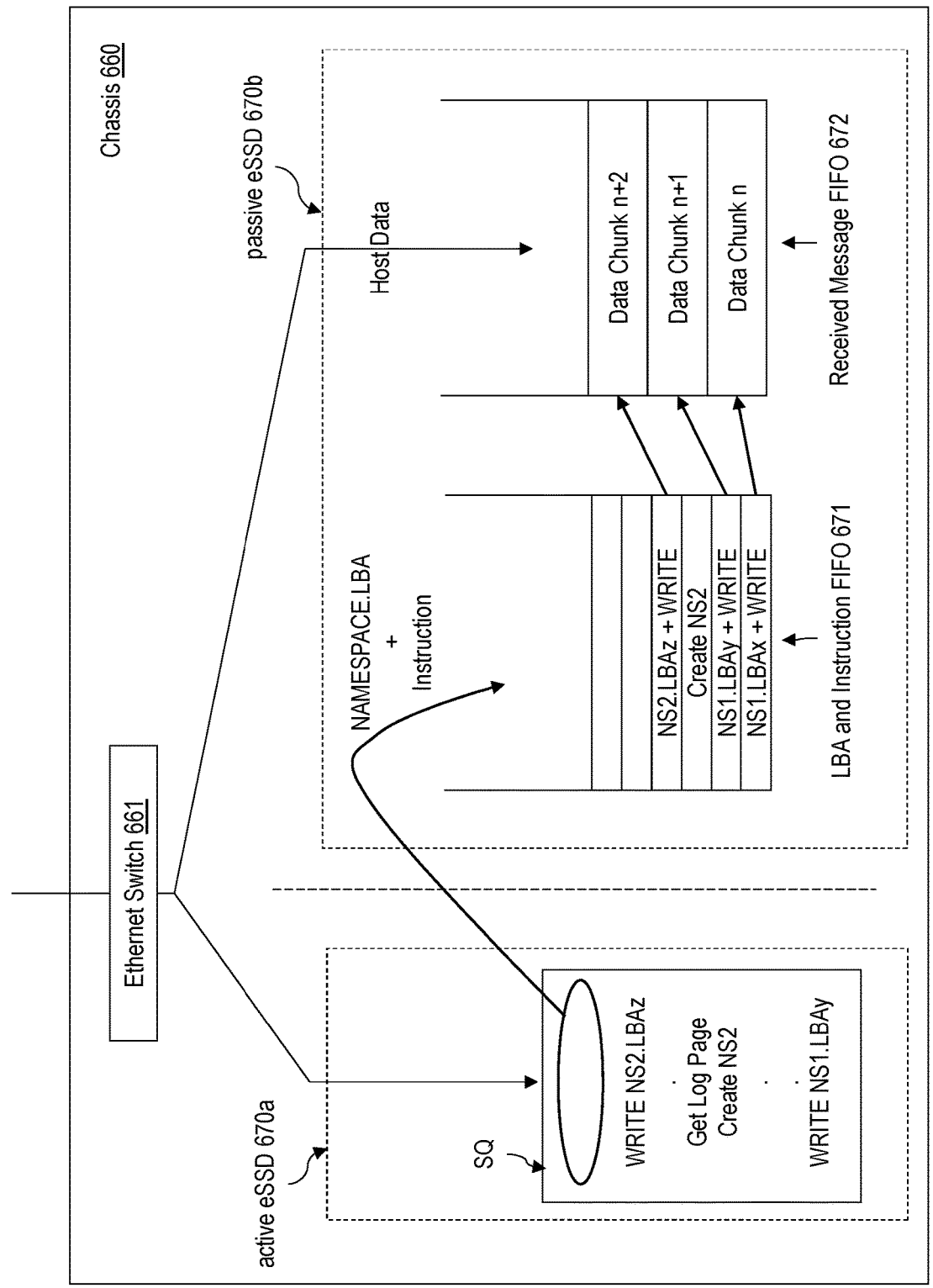
FIG. 6 illustrates an example data replication process, according to one embodiment.

FIG. 6 illustrates an example data replication process, according to one embodiment. The Ethernet switch 661 of the chassis 660 receives host commands from a host over the Ethernet connection and forwards the received host commands to the active eSSD 670*a*. The received host commands may be placed in the submission queue (SQs) of the active eSSD 670*a*. The host commands placed in the submission queue may include host write commands, admin commands (e.g., create a namespace), and normal commands (e.g., get a log page).

When processing a host write command among the received host commands in the submission queue, the active eSSD 670*a* issues a RDMA READ request to the host to fetch data associated with the host write command. The active eSSD 670*a* may issue a series of RDMA READ requests for each data chunks of the host write data associated with the host write command. For each data chunk, the active eSSD 670*a* sends NAMESPACE.LBA and an instruction to store the data in the passive eSSD 670*b*. Meanwhile, the Ethernet switch 661 is programmed to replicate the ingress traffic designated for the active eSSD 670*a* to the passive eSSD 670*b*.

Figure 7:
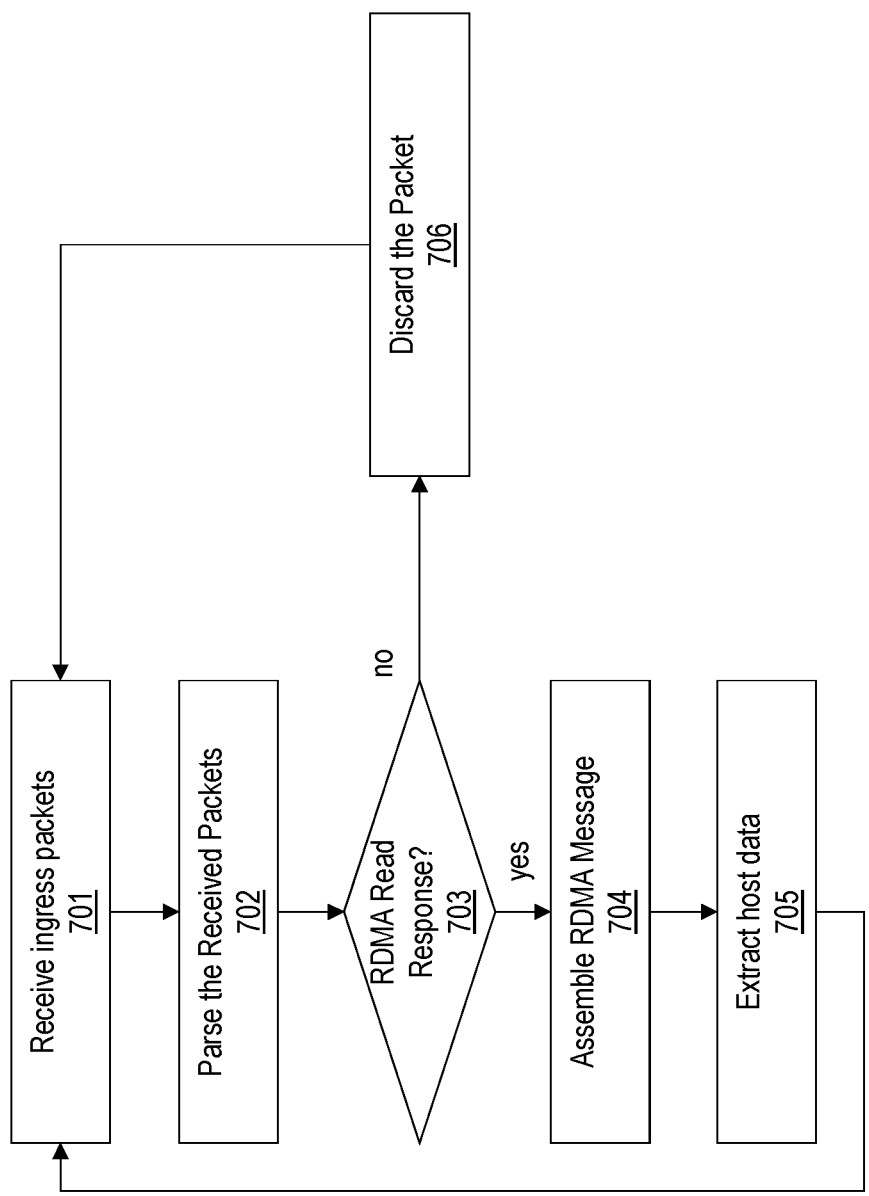
FIG. 7 is a flowchart for processing host commands by a passive eSSD, according to one embodiment.

FIG. 7 is a flowchart for processing host commands by a passive eSSD, according to one embodiment. The passive eSSD receives all the ingress traffic that is destined for the active eSSD (701). The ingress traffic primarily includes RDMA SEND packets carrying host commands and RDMA READ RESPONSE packets carrying host data for host write commands. In addition to the RDMA packets, the ingress traffic may further include other network traffic. The passive eSSD parses the received ingress packets (702). The passive eSSD filters out all the received packets using a packet filter logic to keep only RDMA READ RESPONSE packets (703). The passive eSSD discards the ingress packets other than the RDMA READ RESPONSE packets (706). The passive eSSD assembles the RDMA READ RESPONSE packets into RDMA data messages (704) and extracts the host write data carried in the RDMA READ RESPONSE packets (705).

Referring to FIG. 6, the passive eSSD assembles the RDMA READ RESPONSE packets into RDMA data messages and placed them into a Received Message FIFO 672. The Received Message FIFO 672 temporarily stores host data chunks before storing them in the storage medium of the passive eSSD 670*b*. In addition, the passive eSSD 670*b* stores the NAMESPACE.LBA and the instruction received from the active eSSD 670*a* in a separate buffer, herein referred to as an LBA and Instruction FIFO 671. The NAMEPSACE.LBA and instruction buffered in the LBA and Instruction FIFO 671 may point to the corresponding host data placed in the Received Message FIFO 672 using an identifier or a marker. The passive eSSD 670*b* persists the host data in its own storage medium based on the instruction (e.g., write), the address using the corresponding data chunks. After the host data is persisted, the passive eSSD 670*b* may send a confirmation to the active eSSD 670*a* over a private communication channel.

Figure 8:
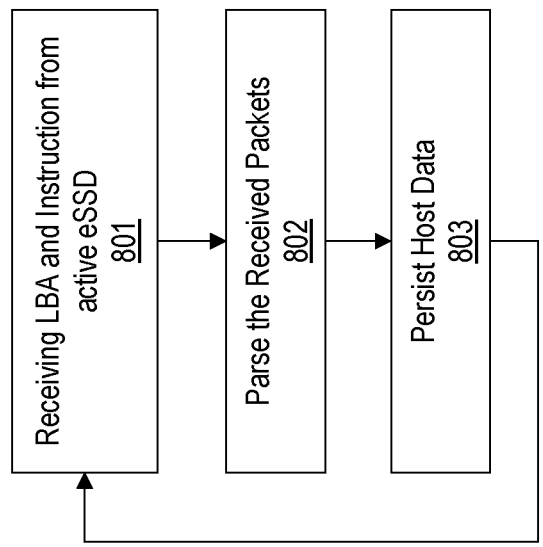
FIG. 8 is a flowchart for communicating LBA and instruction to a passive eSSD from an active eSSD, according to one embodiment.

FIG. 8 is a flowchart for communicating LBA and instructions to a passive eSSD from an active eSSD, according to one embodiment. For each of the data chunk received, the active eSSD sends the associated LBA and an instruction to each of the associated passive eSSD, and the passive eSSD places the LBA and the instruction in the LBA and Instruction FIFO (801). The passive eSSD parses the received ingress packets (802) to place only host write data included in RDMA READ RESPONSE packets in the Received Message FIFO. Using the LBA and the instruction received from active eSSD, the passive eSSD persists the host data in the storage medium (803). The passive eSSD repeats the process to replicate data as instructed by the active eSSD.

The instruction by the active eSSD is typically "Write" instructing the passive eSSD to store the corresponding data chunk at the provided NAMESPACE.LBA. A failure to write a data chunk in the active eSSD can rarely occur. In this case, the active eSSD may send an instruction "Discard" to the passive eSSD. When a passive eSSD encounters a "Discard" instruction, the passive eSSD simply throws the corresponding data chunk. There could be other instructions that the active eSSD may send to the passive eSSD. These instructions can be admin commands such as a namespace management command (e.g., create a namespace) and a trim command that are received by the active eSSD from a host or the Ethernet switch, the BMC, or the PCIe switch of the chassis including the active eSSD and the passive eSSD. The protocol for the admin commands can be extended to include other host commands without deviating from the scope of the present disclosure. When the passive eSSD encounters a non-data command in the LBA and Instruction FIFO, the passive eSSD can execute the non-data command without impacting the Received Message FIFO.

When the instructions are executed by the passive eSSD, the passive eSSD can optionally send the completion confirmation to the active eSSD. In this mode, the active eSSD waits for the confirmations from the associated one or more passive eSSDs before sending a completion queue entry to the host for the original host command. This mode of operation ensures that the active and passive eSSDs are consistent with each other all the time.

Since failures to write a data chunk or failure to execute a command is rare, in some cases, the active eSSD may not wait for the confirmation from the associated passive eSSD(s). An error can happen in one of the associated passive eSSDs and if any of the associated passive eSSDs may fail to write the data or could not execute an instruction. According to one embodiment, the passive eSSD can report an error to replicate the host data as instructed by the active eSSD to the BMC of the chassis. The BMC can take an appropriate action for exception handling and possibly consistency state recovery.

Figure 9:
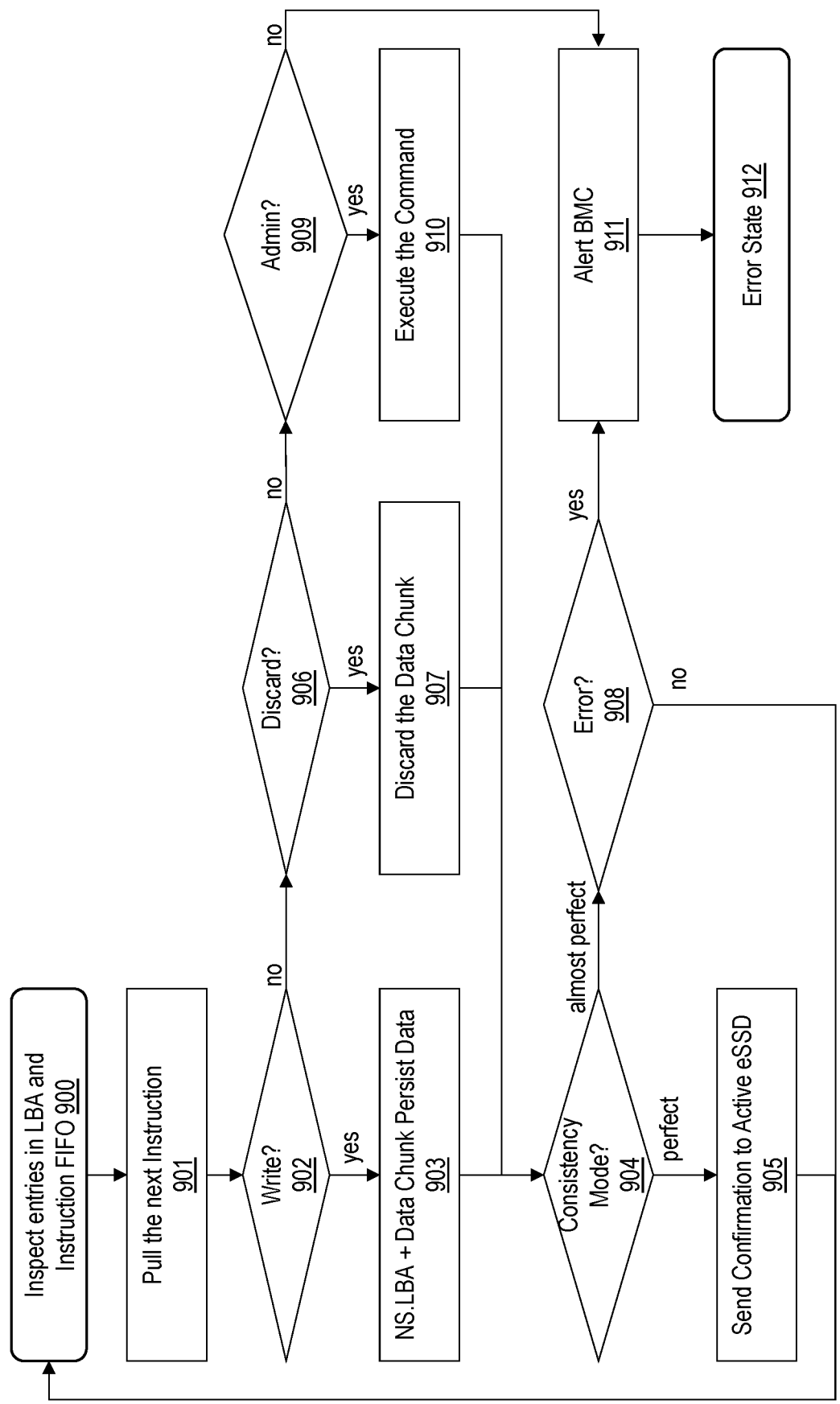
FIG. 9 is a flowchart for processing data replication by a passive eSSD, according to one embodiment.

FIG. 9 is a flowchart for processing data replication by a passive eSSD, according to one embodiment. The BMC configures the active eSSD and associates one or more passive eSSDs with the active eSSD.

The passive eSSD inspects entries in the LBA and Instruction FIFO (900) and pulls the next instruction from the LBA and Instruction FIFO (901). If the instruction is a write instruction (902), the passive eSSD persists the data chunk associated with the write instruction based on the NAMESPACE.LBA (903). If the instruction is not a write instruction (902), the passive eSSD determines if the instruction is a discard instruction (906). The passive eSSD discards the data chunk in response to the discard instruction (907). If the instruction is not a discard instruction (906), the passive eSSD further checks if the instruction is an admin instruction (909) and executes the admin instruction (910). If the instruction is not an admin instruction (909), the passive eSSD alerts the BMC (911) and reports an error state (912).

If the consistency mode of the passive eSSD is a perfect mode (904), the passive eSSD sends a confirmation to the active eSSD (905). If the consistency mode of the passive eSSD is an almost-perfect mode (904), the passive eSSD checks if there is an error (908). In cases of an error, the passive eSSD reports the error to the BMC (911). If there is no error, the passive eSSD inspects the LBA and Instruction FIFO (900) to execute the next instruction in the LBA and Instruction FIFO (901).

According to one embodiment, the BMC can periodically monitor a health status of the active eSSD and the passive eSSDs. For example, the BMC uses the NVMe-MI protocol and specifically NVMe-MI "Health Status Poll" command for the health status monitoring. The BMC may use the PCIe interface or the SMBus interface for management purposes. An eSSD, either an active eSSD or a passive eSSD, may get pulled out from the chassis for various reasons. The BMC periodically receives a "Present" signal from each of the eSSDs in the chassis. In an event of an eSSD being pulled-out, the BMC receives a report of such an event.

Once the BMC determines that the present active eSSD has failed or is no longer present in the chassis, the BM can initiate a failover operation. First, the BMC programs one of the passive eSSDs or a normal eSSD in the chassis in the active mode. If necessary, the BMC may further select another eSSD in the chassis as a new passive eSSD. The BMC reprograms the Ethernet switch to replicate the ingress traffic of the new active eSSD.

Figure 10:
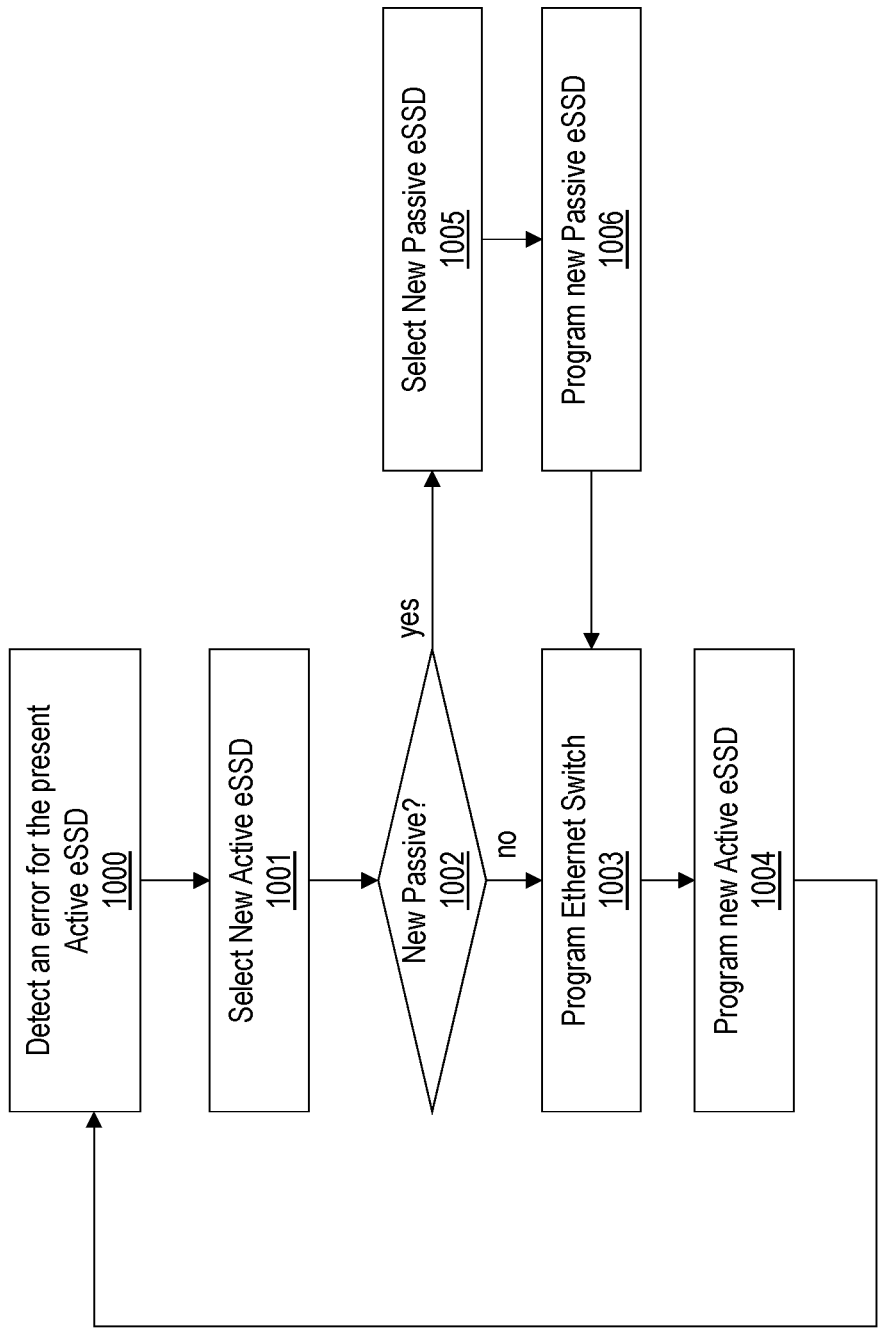
FIG. 10 a flowchart for a failover operation, according to one embodiment.

FIG. 10 a flowchart for a failover operation, according to one embodiment. The BMC can detect that an active eSSD failed or is pulled from the chassis (1000). The BMC select a new active eSSD (1001) from the chassis (1001). According to one embodiment, one of the passive eSSDs or a normal eSSD in the chassis may be converted to the new active eSSD. The BMC then determines whether a new passive eSSD is required (1002). When a new passive eSSD is required (1002), the BMC selects an eSSD in the chassis (1005) and programs the eSSD as a passive eSSD and associate the eSSD with the new active eSSD (1006). If a passive eSSD is converted to the new active eSSD, the number of copies of the host data may be reduced. Therefore, a new passive eSSD may be configured from one of the normal eSSD present in the chassis. Alternatively, a passive eSSD associated with another active eSSD may be converted to the active eSSD. The BMC programs the Ethernet switch of the chassis (1003), and programs the new active eSSD (1004).

In a data replication setup, it is critical to keep the replicated data copies consistent. In other words, the set of eSSDs (active eSSD and associated passive eSSDs) needs to be consistent with each other. If any inconsistency arises, it may not possible to determine which data copy is a correct one, and hence such situation can result in some loss of data. Some use cases may tolerate certain events of data loss, but most of the use cases expect no data loss.

According to one embodiment, the present system and method for providing data replication can guarantee a perfect consistency between the active and the associated passive eSSDs and achieve no data loss. In some cases, a user application can achieve a better latency if it can tolerate some data loss in a rare event. The probability of such data loss may be extremely small.

Based on the use case, the BMC can set the consistency mode of the data replication as a perfect consistency mode or an almost-perfect consistency mode as a part of the replication setup. In the perfect consistency mode, the active eSSD waits for the confirmation from all of the associated passive eSSDs before sending a completion queue entry to the host. In the perfect consistency mode, the active eSSD after persisting its copy of the user data, may not immediately send the host command completion queue entry to ensure that all the passive eSSDs have persisted the host data successfully. The waiting for the confirmation from the passive eSSDs may add a slight latency to the host write accesses. Since the active and passive eSSDs receive the user data at the same time, the additional latency caused by the confirmation from the passive eSSDs would be insignificant. The delay may primarily correspond to the amount of time a passive eSSD confirmation takes to arrive at the active eSSD. The private communication channel between the active eSSD and the passive eSSD is local and dedicated, therefore such an inter-eSSD communication time would be minimal.

If the active eSSD is pulled out or suddenly becomes non-operational, there may be some host write commands in the submission queue. In this case, the active eSSD may not send any command completion queue entries for the partial write commands. Hence, the data integrity from a host point of view can be preserved. The host would re-issue the failed write commands to a different storage unit or wait for the failover switching.

In the almost-perfect consistency mode, the active eSSD does not wait for the confirmations from the associated passive eSSDs. As soon as the active eSSD persists its own copy of the write data, the active eSSD sends the command completion to the host. This results in a better latency to the host compared to the perfect consistency mode. While in this mode, if the active eSSD is pulled out or becomes non-operational, there could be some host write commands in execution. For all the host write commands for which no command completions were already sent, the data integrity can still be preserved. The host can re-issue the write commands to an alternative storage unit. One corner case is that the active eSSD has sent a successful write command completion to the host, but for some reason a passive eSSD fails to persist that data. In this corner case, the host determines that the data is successfully written, but an active copy of the data is no longer available, and the passive copy of the data failed to persist. The probability of the active eSSD being pulled out or becoming non-operational just after sending a write command completion and the passive eSSD failing to persist the associated write data at that time is extremely small. Although almost-perfect consistency mode may provide a slightly better latency, there is a small risk of data loss. For an application that can tolerate such situation, the almost-perfect consistency mode may be a viable option.

According to one embodiment, a method includes: providing a data replication system comprising a plurality of solid-state drives (eSSDs) contained in a chassis, wherein the chassis includes a fabrics switch for providing downlinks to each of the plurality of eSSDs and a baseboard management controller (BMC) for controlling the fabrics switch and the plurality of eSSDs; configuring, using the BMC, one of the plurality of eSSDs as an active eSSD; configuring, using the BMC, one or more of the plurality of eSSDs as one or more passive eSSDs; programming the fabrics switch, using the BMC, to forward packets destined for the active eSSD to both the active eSSD and the one or more passive eSSDs; receiving, at the active eSSD, a host data write command from the host; sending an address and an instruction corresponding to the host data from the active eSSD to the one or more passive eSSDs; storing the host data in the active eSSD; and storing a copy of the host data in the one or more passive eSSDs using the address and the instruction received from the active eSSD and the host data received in the packets forwarded by the fabrics switch.

The active eSSD may be discoverable by the host and the one or more passive eSSDs may not be discoverable by the host.

The method may further include establishing a private communication channel between the active eSSD and the one or more passive eSSDs to send the address and the instruction from the active eSSD to the one or more passive eSSDs.

The private communication channel may be established through the fabrics switch or through a PCIe switch in the chassis.

The method may further include: issuing, using the active eSSD, a remote direct memory access (RDMA) READ request to the host in response to the host data write command; and receiving the host data from the host in one or more RDMA READ RESPONSE packets.

The RDMA READ RESPONSE packets may include data chunks of the host data.

Each of the one or more passive eSSDs may discard the packets received from the fabrics switch except the RDMA READ RESPONSE packets.

The method may further include: sending a completion queue entry to the host after receiving responses from the one or more passive eSSDs or after storing the host data in the active eSSD without receiving responses from the one or more passive eSSDs based on a consistency mode.

Each of the one or more passive eSSDs may include a first buffer for storing the address and the instruction and a second buffer for storing data chunks of the host data.

The method may further include: detecting an error associated with the active eSSD; selecting an eSSD among the plurality of eSSDs in the chassis; configuring the eSSD as a new active eSSD; determining whether a new passive eSSD is required; configuring the new passive eSSD; and programming the fabrics switch to associate the new active eSSD and the one or more passive eSSDs.

According to another embodiment, a data replication system includes a chassis including a plurality of eSSDs, a fabrics switch, and a baseboard management controller (BMC). The fabrics switch is configured to provide downlinks to each of the plurality of eSSDs, and the BMC is configured to control the fabrics switch and the plurality of eSSDs. The BMC configures one of the plurality of eSSDs as an active eSSD and one or more of the plurality of eSSDs as one or more passive eSSDs and programs the fabrics switch to forward packets destined for the active eSSD to both the active eSSD and the one or more passive eSSDs. The active eSSD is configured to store host data in response to a host data write command received from the host. The active eSSD is further configured to send an address and an instruction corresponding to the host data to the one or more passive eSSDs. Each of the one or more passive eSSDs is configured to store a copy of the host data using the address and the instruction received from the active eSSD and the host data received in the packets forwarded by the fabrics switch.

The active eSSD may be discoverable by the host and the one or more passive eSSDs may not be discoverable by the host.

A private communication channel may be established between the active eSSD and the one or more passive eSSDs to send the address and the instruction.

The private communication channel may be established through the fabrics switch or through a PCIe switch in the chassis.

The active eSSD may be further configured to: issue a remote direct memory access (RDMA) READ request to the host in response to the host data write command; and receive the host data from the host in one or more RDMA READ RESPONSE packets.

The RDMA READ RESPONSE packets may include data chunks of the host data.

Each of the one or more passive eSSDs may discard the packets received from the fabrics switch except the RDMA READ RESPONSE packets.

The active eSSD may further be configured to send a completion queue entry to the host after receiving responses from the one or more passive eSSDs or after storing the host data in the active eSSD without receiving responses from the one or more passive eSSDs based on a consistency mode.

Each of the one or more passive eSSDs may include a first buffer for storing the address and the instruction and a second buffer for storing data chunks of the host data.

The BMC may further be configured to: detect an error associated with the active eSSD; select an eSSD among the plurality of eSSDs in the chassis; configure the eSSD as a new active eSSD; determine whether a new passive eSSD is required; configure the new passive eSSD; and program the fabrics switch to associate the new active eSSD and the one or more passive eSSDs and the new passive eSSD.

The above example embodiments have been described hereinabove to illustrate various embodiments of implementing a system and method for providing data replication in an Ethernet SSD. Various modifications and departures from the disclosed example embodiments will occur to those having ordinary skill in the art. The subject matter that is intended to be within the scope of the invention is set forth in the following claims.

What is claimed is:

1. A method comprising:
providing a data replication system comprising a plurality of solid-state drives (eSSDs) contained in a chassis, wherein the chassis includes a fabrics switch for providing downlinks to each of the plurality of eSSDs and a baseboard management controller (BMC) for controlling the fabrics switch and the plurality of eSSDs;
configuring, using the BMC, one of the plurality of eSSDs as an active eSSD;
configuring, using the BMC, one or more of the plurality of eSSDs as one or more passive eSSDs;
programming the fabrics switch, using the BMC, to forward network packets addressed to the active eSSD to both the active eSSD via a first downlink port and each of the one or more passive eSSDs via a second downlink port that is different from the first downlink port;
receiving, at the active eSSD, a network packet including a host data write command from the host via the first downlink port through the fabrics switch;
storing a host data associated with the host data write command in a memory location of the active eSSD;
sending the memory location of the active eSSD and an instruction corresponding to the host data write command from the active eSSD to the one or more passive eSSDs; and
storing a copy of the host data in the one or more passive eSSDs using the memory location of the active eSSD and the instruction received from the active eSSD and the host data received in the network packet that is forwarded by the fabrics switch via the second downlink port.

2. The method of claim 1, wherein the active eSSD is discoverable by the host and the one or more passive eSSDs are not discoverable by the host.

3. The method of claim 1, further comprising establishing a private communication channel between the active eSSD and the one or more passive eSSDs to send the memory location and the instruction from the active eSSD to the one or more passive eSSDs.

4. The method of claim 3, wherein the private communication channel is established through the fabrics switch or through a PCIe switch in the chassis.

5. The method of claim 1, further comprising:
issuing, using the active eSSD, a remote direct memory access (RDMA) READ request to the host in response to the host data write command; and
receiving the host data from the host in one or more RDMA READ RESPONSE packets.

6. The method of claim 5, wherein the RDMA READ RESPONSE packets include data chunks of the host data.

7. The method of claim 5, wherein each of the one or more passive eSSDs discards the packets received from the fabrics switch except the RDMA READ RESPONSE packets.

8. The method of claim 1, further comprising: sending a completion queue entry to the host after receiving responses from the one or more passive eSSDs or after storing the host data in the active eSSD without receiving responses from the one or more passive eSSDs based on a consistency mode.

9. The method of claim 1, wherein each of the one or more passive eSSDs includes a first buffer for storing the memory location and the instruction and a second buffer for storing data chunks of the host data.

10. The method of claim 1, further comprising:
detecting an error associated with the active eSSD;
selecting an eSSD among the plurality of eSSDs in the chassis;
configuring the eSSD as a new active eSSD;
determining whether a new passive eSSD is required;
configuring the new passive eSSD; and
programming the fabrics switch to associate the new active eSSD and the one or more passive eSSDs.

11. A data replication system comprising:
a chassis including a plurality of eSSDs, a fabrics switch, and a baseboard management controller (BMC);
wherein the fabrics switch is configured to provide downlinks to each of the plurality of eSSDs, and the BMC is configured to control the fabrics switch and the plurality of eSSDs,
wherein the BMC configures one of the plurality of eSSDs as an active eSSD and one or more of the plurality of eSSDs as one or more passive eSSDs and programs the fabrics switch to forward network packets addressed to the active eSSD to both the active eSSD via a first downlink port and each of the one or more passive eSSDs via a second downlink port that is different from the first downlink port,
wherein the active eSSD is configured to receive a network packet including a host data write command from the host via the first downlink port through the fabrics switch and store a host data associated with the host data write command in a memory location,
wherein the active eSSD is further configured to send the memory location and an instruction corresponding to the host data to the one or more passive eSSDs, and
wherein each of the one or more passive eSSDs is configured to store a copy of the host data using the memory location of the active eSSD and the instruction received from the active eSSD and the host data received in the network packet that is forwarded by the fabrics switch via the second downlink port.

12. The data replication system of claim 11, wherein the active eSSD is discoverable by the host and the one or more passive eSSDs are not discoverable by the host.

13. The data replication system of claim 11, wherein a private communication channel is established between the active eSSD and the one or more passive eSSDs to send the memory location and the instruction.

14. The data replication system of claim 13, wherein the private communication channel is established through the fabrics switch or through a PCIe switch in the chassis.

15. The data replication system of claim 11, wherein the active eSSD is further configured to:
issue a remote direct memory access (RDMA) READ request to the host in response to the host data write command; and
receive the host data from the host in one or more RDMA READ RESPONSE packets.

16. The data replication system of claim 15, wherein the RDMA READ RESPONSE packets include data chunks of the host data.

17. The data replication system of claim 15, wherein each of the one or more passive eSSDs discards the packets received from the fabrics switch except the RDMA READ RESPONSE packets.

18. The data replication system of claim 11, wherein the active eSSD is further configured to send a completion queue entry to the host after receiving responses from the one or more passive eSSDs or after storing the host data in the active eSSD without receiving responses from the one or more passive eSSDs based on a consistency mode.

19. The data replication system of claim 11, wherein each of the one or more passive eSSDs includes a first buffer for storing the memory location and the instruction and a second buffer for storing data chunks of the host data.

20. The data replication system of claim 11, wherein the BMC is further configured to:
- detect an error associated with the active eSSD;
- select an eSSD among the plurality of eSSDs in the chassis;
- configure the eSSD as a new active eSSD;
- determine whether a new passive eSSD is required;
- configure the new passive eSSD; and
- program the fabrics switch to associate the new active eSSD and the one or more passive eSSDs and the new passive eSSD.

* * * * *